United States Patent
Fukuhara et al.

(10) Patent No.: US 10,636,311 B2
(45) Date of Patent: Apr. 28, 2020

(54) CONVEYANCE INFORMATION PROCESSING DEVICE, CONTROL METHOD, AND CONVEYANCE DATA PROVIDING SYSTEM

(71) Applicant: HONDA MOTOR CO. LTD., Tokyo (JP)

(72) Inventors: Kichinosuke Fukuhara, Tokyo (JP); Kei Nakajima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/290,155

(22) Filed: Mar. 1, 2019

(65) Prior Publication Data
US 2019/0287410 A1 Sep. 19, 2019

(30) Foreign Application Priority Data

Mar. 13, 2018 (JP) ................. 2018-045256

(51) Int. Cl.
*G08G 1/00* (2006.01)
*G07C 5/00* (2006.01)
*G07C 5/08* (2006.01)

(52) U.S. Cl.
CPC ............. *G08G 1/205* (2013.01); *G07C 5/006* (2013.01); *G07C 5/008* (2013.01); *G07C 5/0808* (2013.01)

(58) Field of Classification Search
CPC ........ G08G 1/205; G07C 5/008; G07C 5/006; G07C 5/0808
USPC ...................................... 340/425.5
See application file for complete search history.

(56) References Cited

U.S. PATENT DOCUMENTS

| 7,471,999 | B2 * | 12/2008 | Taki ..................... G07C 5/008 |
| | | | 340/458 |
| 9,053,588 | B1 * | 6/2015 | Briggs .................. G07C 5/006 |
| 9,105,051 | B2 * | 8/2015 | Ricci ..................... H04W 4/90 |
| 10,322,747 | B2 * | 6/2019 | Fujimoto ............ B60W 50/035 |

(Continued)

FOREIGN PATENT DOCUMENTS

| JP | 2002-048684 | 2/2002 |
| JP | 2002-189830 | 7/2002 |

(Continued)

OTHER PUBLICATIONS

Japanese Office Action dated Sep. 24, 2019, English translation included, 7 pages.

*Primary Examiner* — John A Tweel, Jr.
(74) *Attorney, Agent, or Firm* — Rankin, Hill & Clark LLP

(57) ABSTRACT

Provided is an onboard terminal including a vehicle data reception part configured to receive a failure code for identifying a failure occurred in a vehicle, a current position of the vehicle, and vehicle operation information from the vehicle, a failure information recording part configured to record failure information including at least one position of the conveyance before timing of occurrence of the failure and at least one position of the conveyance after the timing of the occurrence of the failure and the vehicle operation information, and a failure information providing command part configured to give a command, in accordance with an operation of the user, to a data server managing the failure information to provide the failure information to a repairer undertaking a repair of the vehicle through an electric communication line.

10 Claims, 8 Drawing Sheets

(56) References Cited

U.S. PATENT DOCUMENTS

2008/0183484 A1* 7/2008 Kondo ............... G05B 23/0216
705/1.1
2019/0287318 A1* 9/2019 Fukuhara ............... G07C 5/008

FOREIGN PATENT DOCUMENTS

| JP | 2002-334168 | 11/2002 |
| JP | 2005-145377 | 6/2005 |
| JP | 2008-197945 | 8/2008 |
| JP | 2009-227250 | 10/2009 |

* cited by examiner

CONVEYANCE INFORMATION PROCESSING DEVICE, CONTROL METHOD, AND CONVEYANCE DATA PROVIDING SYSTEM

INCORPORATION BY REFERENCE

The present application claims priority under 35 U.S.C. § 119 to Japanese Patent Application No. 2018-045256 filed on Mar. 13, 2018. The content of the application is incorporated herein by reference in its entirety.

BACKGROUND OF THE INVENTION

Field of the Invention

The present invention relates to a conveyance information processing device, a control method, and a conveyance data providing system.

Description of the Related Art

Vehicles such as automobiles and motorcycles generally record occurrences of failures, warnings, and the like, so that it is possible for vehicle repair service providers to grasp the occurrences of failures and warnings based on the record.

Further, also known is a technique with which a vehicle transmits internal data such as operating data of various products loaded on the vehicle to a center via a communication network, and the center side diagnoses failures of the vehicle based on the internal data (see Japanese Patent Laid-Open No. 2002-48684, for example).

Various kinds of data collected from vehicles may include information regarding individuals. With conventional techniques, however, users do not surely grasp that data from the vehicles is provided to third parties the users do not know.

It is an object of the present invention to provide a conveyance information processing device, a control method, and a conveyance data providing system, with which users can surely grasp that data acquired from conveyances such as vehicles is provided to third parties.

SUMMARY OF THE INVENTION

An aspect of the present invention provides a conveyance information processing device including: a conveyance data reception part configured to receive a failure code for identifying a failure occurred in a conveyance, a current position of the conveyance, and conveyance operation information from the conveyance; a failure information recording part configured to record failure information including at least one position of the conveyance before timing of occurrence of the failure and at least one position of the conveyance after the timing of the occurrence of the failure and the conveyance operation information; and a failure information providing command part configured to give a command, in accordance with an operation of a user, to a terminal managing the failure information to provide the failure information to a repairer undertaking a repair of the conveyance through an electric communication line.

In the conveyance information processing device according to the aspect of the present invention, the repairer to be provided with the failure information is shown to the user.

The conveyance information processing device according to the aspect of the present invention further includes a providing target selection part capable of allowing the user to select the repairer to be provided with the failure information.

In the conveyance information processing device according to the aspect of the present invention, the failure information providing command part gives a command to the terminal to provide the failure information to the repairer in accordance with a viewing period inputted by the user.

The conveyance information processing device according to the aspect of the present invention further includes: a repair plan reception part configured to receive repair plans transmitted from each of a plurality of the repairers; a repair plan presenting part configured to present each of the repair plans to the user for allowing the user to select; and a repair reservation transmission part configured to transmit repair reservation information for reserving a repair toward the repairer of the repair plan selected by the user through the electric communication line.

The conveyance information processing device according to the aspect of the present invention further includes a refining part configured to refine a search of the repair plans under a condition of at least one selected from due dates, locations of the repairers, and actual repair costs of failures repaired in the past with a similar cause of failure written in the repair plans.

In the conveyance information processing device according to the aspect of the present invention, the repair plan is transmitted from the repairer to an address at which an electronic apparatus operated by the user can acquire the repair plan through the electric communication line.

The conveyance information processing device according to the aspect of the present invention further includes: an external apparatus connection part where an external apparatus is connected; and a failure information externally output part configured to output the failure information to the external apparatus connected to the external apparatus connection part.

An aspect of the present invention provides a control method of a conveyance information processing device configured to receive a failure code for identifying a failure occurred in a conveyance, a current position of the conveyance, and conveyance operation information from the conveyance. The control method includes: recording failure information including at least one position of the conveyance before timing of occurrence of the failure and at least one position of the conveyance after the timing of the occurrence of the failure and the conveyance operation information; and giving a command, in accordance with an operation of a user, to a terminal managing the failure information to provide the failure information to a repairer undertaking a repair of the conveyance through an electric communication line.

An aspect of the present invention provides a conveyance data providing system including: a conveyance information processing device including a conveyance data reception part configured to receive a failure code for identifying a failure occurred in a conveyance, a current position of the conveyance, and conveyance operation information from the conveyance; and a terminal configured to communicate with the conveyance information processing device through an electric communication line, wherein: the conveyance information processing device includes a failure information recording part configured to record failure information including at least one position of the conveyance before timing of occurrence of the failure and a at least one position of the conveyance after the timing of the occurrence of the failure and the conveyance operation information; the terminal manages the failure information; and the conveyance information processing device includes a failure information providing command part configured to give a command, in accordance with an operation of a user, to the terminal to provide the failure information to a repairer undertaking a repair of the conveyance through the electric communication line.

With the aspect of the present invention, it is possible for the user to surely grasp that the data acquired from the conveyance is provided to the third parties.

DETAILED DESCRIPTION OF THE PREFERRED EMBODIMENT

Hereinafter, an embodiment of the present invention will be described by referring to the accompanying drawings.

Figure 1:
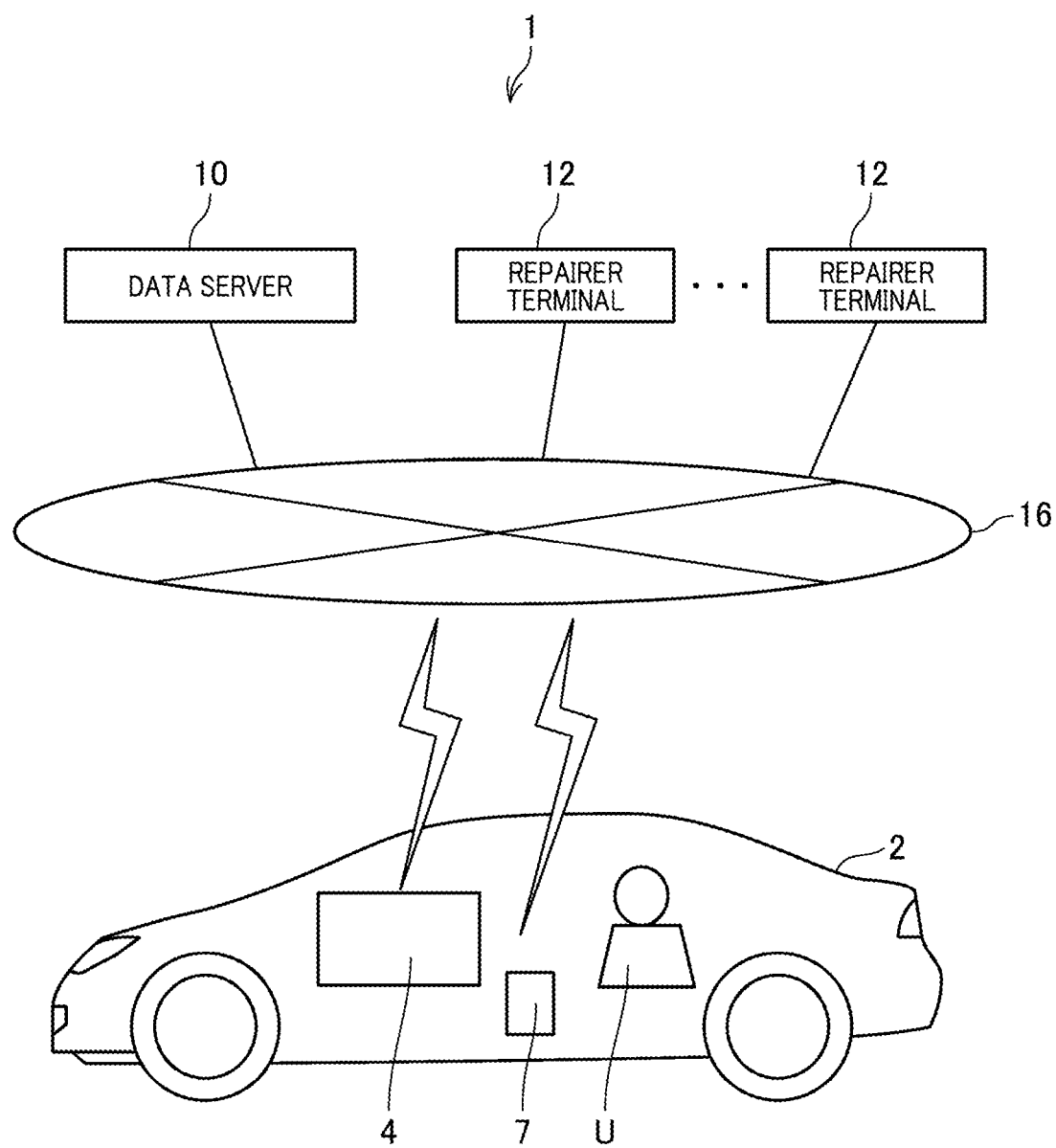
FIG. 1 is an illustration schematically showing a configuration of a vehicle data providing system according to an embodiment of the present invention.

FIG. 1 is an illustration schematically showing a configuration of a vehicle data providing system 1 according to the present embodiment.

The vehicle data providing system 1 includes an onboard terminal 4 loaded on a vehicle 2, a user terminal 7 carried by a user U, a data server 10, and a plurality of repairer terminals 12, and those are connected to an electric communication line 16 to be communicable. The electric communication line 16 is a communication line including a mobile communication network (e.g., cellular phone communication network) for providing mobile communications and the Internet, for example, for providing wide-area communications.

The vehicle 2 is an automobile that includes a motor such as an internal combustion engine, a hybrid engine, or an electric motor and runs under a power of the motor. While the vehicle 2 is a four-wheeled motor vehicle in the present embodiment, the vehicle 2 may be another motor vehicle such as a two-wheeled motor vehicle and may not be limited to motor vehicles but may be other vehicles such as railway vehicles.

The onboard terminal 4 is an onboard information processing device configured to collect various kinds of data from the vehicle 2 where the onboard information processing device itself is loaded. Further, the onboard terminal 4 records failure information 18 (FIG. 3) when there is a failure, and transmits the failure information 18 to the data server 10 via the electric communication line 16. The failure information 18 will be described later in detail.

The user terminal 7 is a terminal carried by the user U and operable by the user U, which is a communication terminal communicable via the electric communication line 16. Specific examples of the user terminal 7 may be a mobile phone, a smartphone, a mobile personal computer, a portable music player, a smartwatch, and the like.

Further, the onboard terminal 4 and the user terminal 7 are connected to be able to transmit and receive data mutually by wire connection or wireless connection, for example.

The data server 10 is a server computer provided at a data center or the like, and receives and manages the failure information 18 transmitted from the onboard terminal 4 via the electric communication line 16. Further, the data server 10 has a function of providing, via the electric communication line 16, the failure information 18 to the repairer terminal 12 indicated by the user U through the user terminal 7.

Each of the repairer terminals 12 is a terminal owned by different repairers, and connected to be communicable to the electric communication line 16. Each of the repairer terminals 12 receives the failure information 18 provided from the data server 10 through the electric communication line 16. The repairers are companies undertaking repairs, maintenances, inspections, and the like of the vehicle 2, and include the dealer of the vehicle 2.

Next, configurations of each part of the vehicle data providing system 1 will be described in detail.

Figure 2:
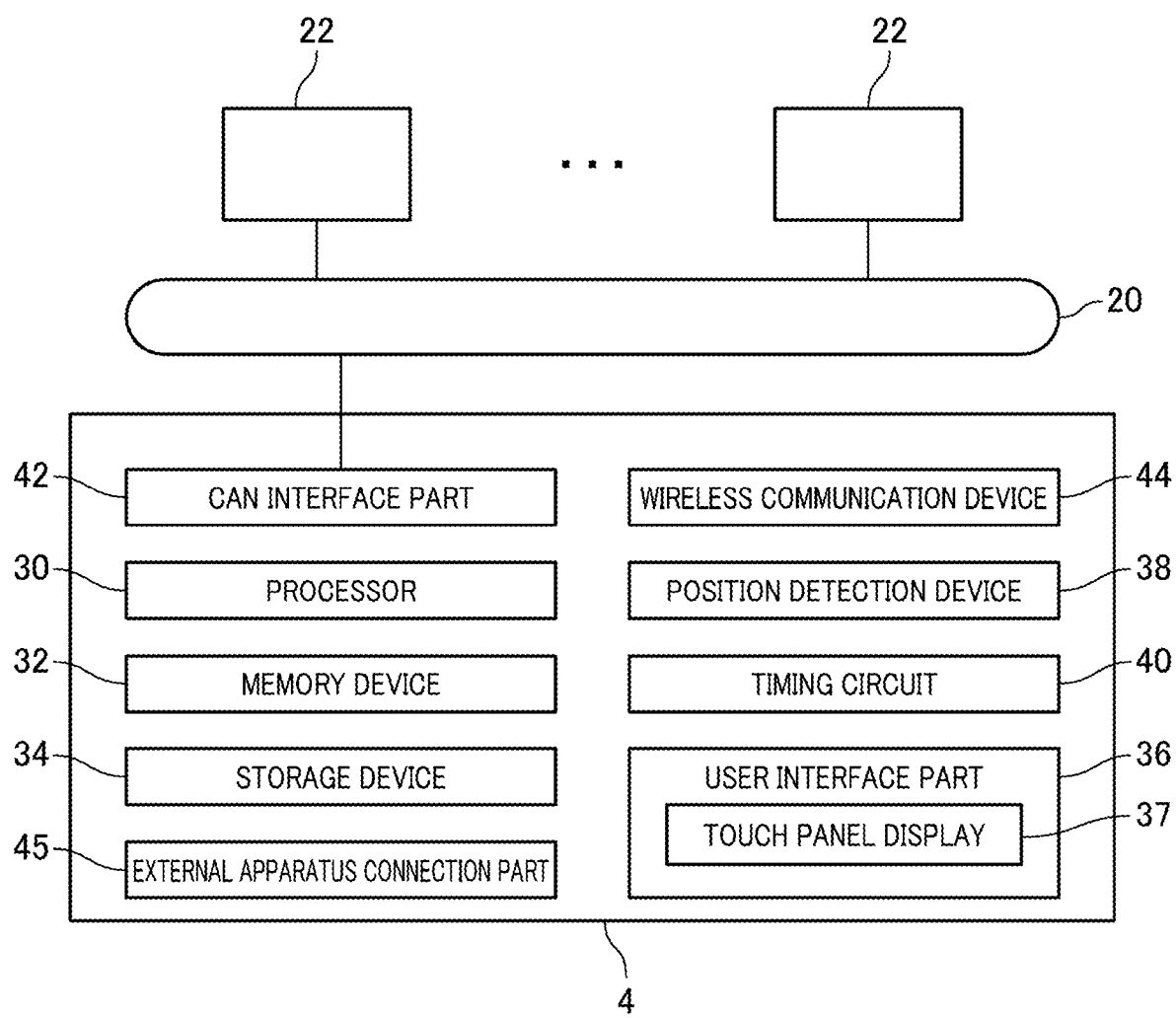
FIG. 2 is a diagram schematically showing a configuration of an onboard system provided to a vehicle along with an electric configuration of an onboard terminal.

FIG. 2 is a diagram schematically showing a configuration of an onboard system provided to the vehicle 2 along with an electric configuration of the onboard terminal 4.

The onboard system includes a CAN (Controller Area Network) 20, a plurality of electronic control units 22, and the onboard terminal 4.

The CAN 20 is an example of a network for vehicles (also called an onboard network). The electronic control units 22 and the onboard terminal 4 are connected to the CAN 20, and the electronic control units 22 and the onboard terminal 4 communicate according to CAN communications protocol.

The electronic control units 22 are the so-called electronic circuit units referred to as "ECU". Examples of the electronic control units 22 provided to the vehicle 2 may be an electronic circuit unit configured to controlling actions of a power train including an engine, an electronic circuit unit controlling a gearbox, and an electronic circuit unit controlling electric and electronic parts. Examples of the electric and electronic parts may be a windshield wiper, a door lock, room light, a direction indicator, and a tail lump lamp.

Intrinsic identification information is allotted to each of the electronic control units 22, and the onboard terminal 4 can communicate with each of the electronic control units 22 by using the identification information.

The onboard terminal 4 includes a processor 30, a memory device 32, a storage device 34, a user interface part 36, a position detection device 38, a timing circuit 40, a CAN interface part 42, a wireless communication device 44, and an external apparatus connection part 45.

The processor 30 is an arithmetic operation unit such as a CPU or an MPU configured to implement various kinds of functions by executing arithmetic operations according to computer programs. The memory device 32 includes a RAM, a ROM, and the like capable of performing high-speed reading actions and writing actions. The memory device 32 functions as a work area of the processor 30, and also stores various kinds of data and computer programs. The storage device 34 is a device having a relatively large data storage capacity than the memory device 32, and an HDD, an SSD, or the like is used for the storage device 34. The user interface part 36 includes a function as an input device for enabling user operations and a function as a display device of GUI (Graphical User Interface) for displaying various kinds of operation screens, messages, and the like. The user interface part 36 includes a touch panel display 37. Note that various kinds of hard keys can also be used as the input device of the user interface part 36, and any display such as an organic EL or a liquid crystal display can also be used as the display device.

The position detection device 38 is a device for detecting a current position (information of longitude and latitude), and a GPS, for example, is used for the position detection device 38.

The timing circuit 40 includes a clock circuit, and keeps the current hour as well as the date and time.

The CAN interface part 42 is an interface for connecting to the CAN 20. The processor 30 communicates with each of the electronic control units 22 connected to the CAN 20 through the CAN interface part 42, and collects various kinds of data from those electronic control units 22.

The wireless communication device 44 includes a wireless communication circuit configured to communicate by wirelessly connecting to the electric communication line 16.

The external apparatus connection part 45 is a connection interface for wire-connecting or wirelessly connecting an external apparatuses such as the user terminal 7 or the like. For the connection interface, any connection such as USB connection or Bluetooth connection (R) can be used. Further, a portable storage device such as a USB memory as an external apparatus is connected to the external apparatus connection part 45, and the onboard terminal 4 can write the data to the portable storage device.

When another onboard device such as a navigation device having the function of the position detection device 38 and the function of the timing circuit 40 and the electronic control units 22 are connected to the CAN 20, the processor 30 may acquire the current position, hour, and the date and time from such onboard device and the electronic control units 22.

Figure 3:
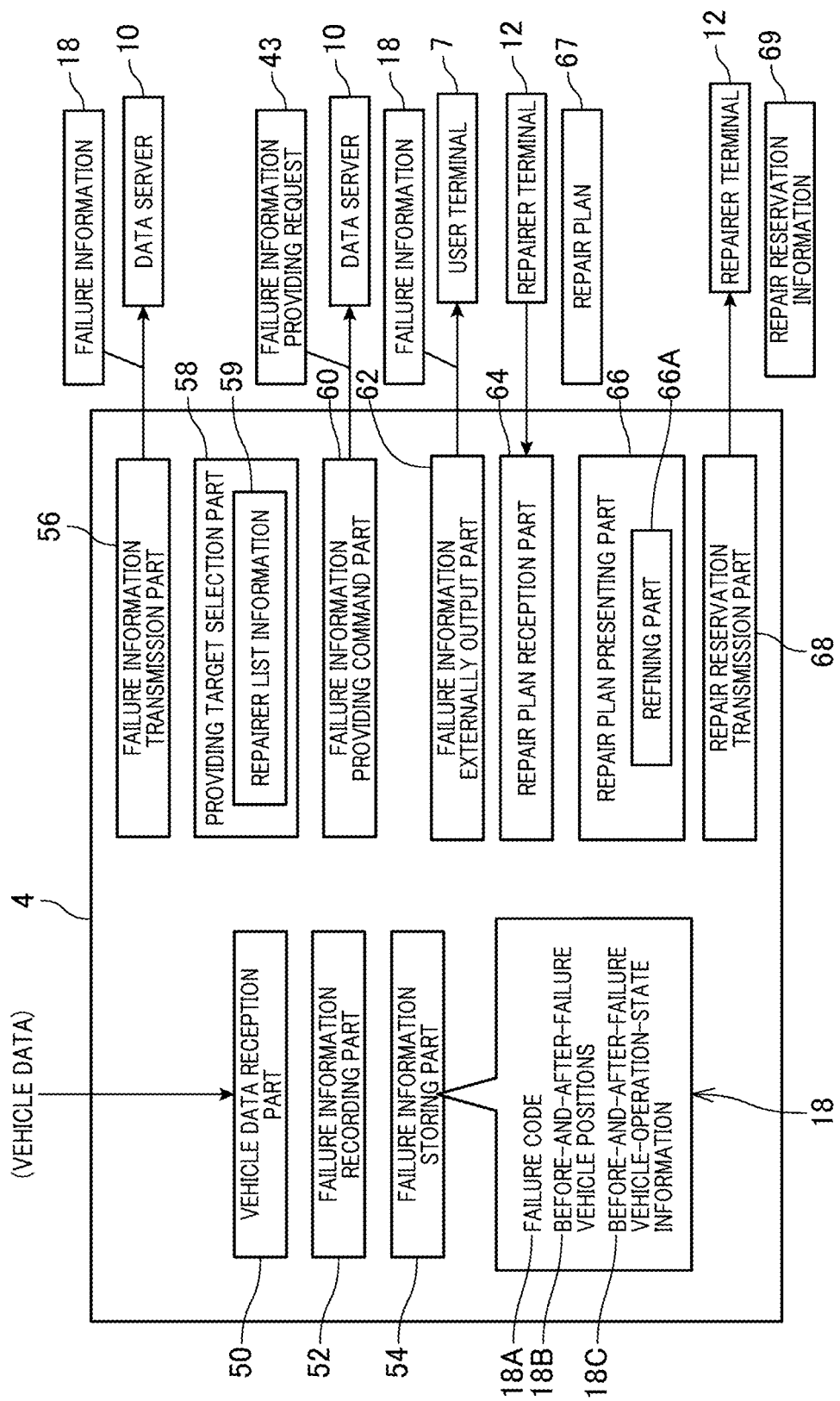
FIG. 3 is a diagram showing a functional configuration of the onboard terminal.

FIG. 3 is a diagram showing a functional configuration of the onboard terminal 4.

The onboard terminal 4 includes a vehicle data reception part 50, a failure information recording part 52, a failure information storing part 54, a failure information transmission part 56, a providing target selection part 58, a failure information providing command part 60, a failure information externally output part 62, a repair plan reception part 64, a repair plan presenting part 66, and a repair reservation transmission part 68. Each of those functional parts is implemented by executing the computer programs by the processor 30 of the onboard terminal 4.

The vehicle data reception part 50 receives various kinds of data from each of the electronic control units 22, position detection device 38, and timing circuit 40 via the CAN 20. The data includes the current hour, date, current position of the vehicle 2, running time, running distance, fuel efficiency, a failure code identifying the failure occurred in the vehicle 2, light-up of a warning lamp, vehicle operation state information, vehicle model, and the like. When the vehicle 2 is an electric vehicle or a hybrid vehicle, power consumption required for running, remaining electric amount of the battery, and the like are included in the data received by the vehicle data reception part 50.

The vehicle operation state information is the information showing the operation state of each component of the vehicle 2, and includes any information that can be acquired from each of the electronic control units 22.

Further, during a data receiving operation, the vehicle data reception part 50 buffers each piece of data by holding the data in the memory device 32 until a prescribed time passes from the received point of the data.

Upon receiving the failure code at the vehicle data reception part 50 due to a failure occurred in the vehicle 2, the failure information recording part 52 records the failure information 18 described above based on the data received by the vehicle data reception part 50.

The failure information 18 is the information including a plurality of pieces of data useful for specifying a cause of the failure among the data received by the vehicle data reception part 50. In the present embodiment, the failure information 18 includes a failure code 18A, before-and-after-failure vehicle positions 18B, and before-and-after-failure vehicle-operation-state information 18C. The before-and-after-failure vehicle positions 18B are positions of the vehicle 2 before and after timing of occurrence of a failure. The before-and-after-failure vehicle-operation-state information 18C is a group of vehicle operation state information received by the vehicle data reception part 50 during a specific period before and after the timing of occurrence of the failure, and collected from the data being buffered by the vehicle data reception part 50.

Note that the failure information recording part 52 may record the failure information 18 also when light-up of the warning lamp is received by the vehicle data reception part 50. In such case, information of the light-up warning lamp is recorded as the failure code 18A, and a group of vehicle operation state information received by the vehicle data reception part 50 during a prescribed time before and after the timing the warning lamp is lighted up is recorded as the before-and-after-failure vehicle-operation-state information 18C.

Such information is recorded as the failure information 18 and provided to the repairer, so that the user U can be provided with a preventive diagnosis by the repairer before having failures.

The failure information storing part 54 stores the failure information 18 recorded by the failure information recording part 52 to the storage device 34.

The failure information transmission part 56 transmits the failure information 18 stored in the failure information storing part 54 to the data server 10 from the wireless communication device 44. After the failure information 18 is recorded, the failure information transmission part 56 promptly transmits the failure information 18 at the time the wireless communication device 44 becomes communicable with the data server 10. Note that the transmission timing of the failure information 18 may be set as appropriate.

The providing target selection part 58 is configured to display a list of repairers on the touch panel display 37 for allowing the user U to select the repairer as the providing target of the failure information 18 among the list of the repairers by a touching operation. The list of the repairers is generated based on repairer list information 59 including information of each of the repairers. The repairer list information 59 includes information regarding the repairers (names, addresses, telephone numbers, e-mail addresses, and the like). The repairer list information 59 is distributed as appropriate from the data server 10 or other server computers, for example, via the electric communication line 16, and the repairer list information 59 is updated in the storage device 34 every time the onboard terminal 4 receives the repairer list information 59.

The failure information providing command part 60 gives a command to the data server 10 to provide the failure information 18 to the repairer selected by the user U. This command is given by the failure information providing command part 60 through transmitting a failure information providing request 43 (FIG. 4) showing such command content to the data server 10 from the wireless communication device 44.

The providing target selection part 58 allows the user U to input a viewing period where the repairer can view the failure information 18. Further, the failure information providing command part 60 transmits the failure information providing request 43 by including an input value of the viewing period to the data server 10.

Through limiting the viewing period of the failure information 18, it becomes possible to decrease a risk of having the failure information 18 including information (current position and the like of the vehicle 2) capable of specifying behaviors of the user U leaked to third parties the user U does not know.

The failure information externally output part 62 outputs the failure information 18 to external apparatuses (the user terminal 7, the portable memory device, and the like) connected to the external apparatus connection part 45 according to a user operation.

When a desired repairer is not in the list of the repairers presented by the providing target selection part 58, for example, the user U can output the failure information 18 to the external apparatus and give the failure information 18 to any repairer desired by the user U along with a request for a repair and the like.

The repair plan reception part 64 receives the repair plan 67 at the wireless communication device 44. The repair plan 67 is document data created by the repairer based on the failure information 18. A cause of the failure of the vehicle 2, repair content, due date, and estimate of repair cost are shown in the repair plan 67.

The repair plan presenting part 66 displays a single or a plurality of repair plans 67 received by the repair plan reception part 64 on the touch panel display 37 to present to the user U. The repair plan presenting part 66 includes a refining part 66A for refining a search of the repair plans corresponding to set conditions for enabling the user U to easily find a desired repair plan from the repair plans 67 when there are the plurality of repair plans 67 received from different repairers.

The set conditions may be due date, location of the repairer, distance from the current position of the vehicle 2 to the location of the repairer, actual cost of repair performed in the past under a cause of failure similar to the cause of failure shown in the repair plan 67, estimation of the repair cost, or the like.

Note that the cause of failure repaired in the past and the actual cost of the repair are accumulated in the storage device 34 through inputting the cause and the actual cost to the onboard terminal 4 by the user U every time a repair is performed or through receiving the document data (data of bills and details of the repair cost, for example) including the cause of failure and the actual cost of the repair from the repairer terminal 12, for example.

Further, the distance from the current position of the vehicle 2 to the location of the repairer is acquired from the navigation device provided to the vehicle 2 or acquired by inquiring to the server computer that distributes map information.

When the user U selects one repair plan 67 by operating the touch panel display 37, the repair reservation transmission part 68 transmits repair reservation information 69 to an address (electronic mail address shown in the repairer list information 59 in the present embodiment) at which the repairer of the repair plan 67 can acquire the repair reservation information 69 by operating the repairer terminal 12.

The repair reservation information 69 is the information for reserving a repair of the vehicle 2 at the repairer, and includes information specifying the user U, reserving date, and information for allowing the repairer to specify the repair plan (e.g., a number allotted uniquely to the repair plan 67 by the repairer).

Figure 4:
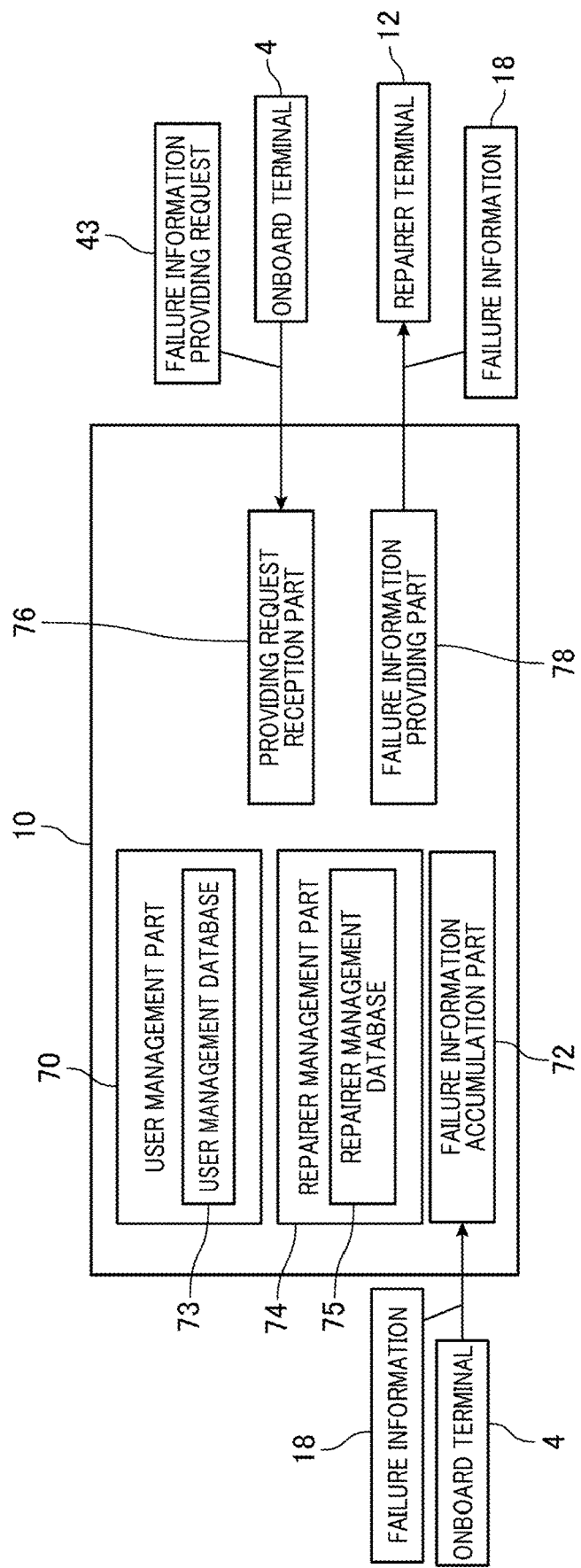
FIG. 4 is a block diagram showing a functional configuration of a data server.

FIG. 4 is a block diagram showing a functional configuration of the data server 10.

The data server 10 includes a user management part 70, a failure information accumulation part 72, a repairer management part 74, a providing request reception part 76, and a failure information providing part 78.

As the data server 10, used is a server computer including a processor such as a CPU or an MPU, a memory device such as a ROM or a RAM, a data storing device such as an HDD or an SSD, and a communication device capable of connecting to the electric communication line 16. Further, each function shown in FIG. 4 can be implemented by executing software programs stored in the memory device by the processor. Note that each of the functions of the data server 10 may be implemented separately by a plurality of server computers.

The user management part 70 manages the information related to the user U based on a user management database 73. The user management database 73 is the data stored in the data storing device. In the user management database 73, recorded is the information capable of identifying the failure information 18 received from the onboard terminal 4 of the user U by each piece of the information regarding the user U. The information regarding the user U includes the name, age, sex, contact information, address used when transmitting the electronic data via the electric communication line 16.

This address may be any address at which the user U can acquire the data via the electric communication line 16 by using the electronic apparatus (e.g., the user terminal 7). Examples of such address may be an e-mail address, an account of SNS (Social Networking Service), and an address of cloud storage or FTP server the user U can access.

The failure information accumulation part 72 accumulates the failure information 18 transmitted from the onboard terminal 4 to the data storing device.

The repairer management part 74 manages information related to the repairers based on the repairer management database 75. The repairer management database 75 is the data including recorded information regarding the repairers, and stored in the data storing device. The information regarding the repairers include names, locations, telephone numbers, e-mail addresses and the like as in the repairer list information 59 described above.

The providing request reception part 76 receives the failure information providing request 43 described above from the onboard terminal 4.

The failure information providing part 78 provides the failure information 18 to the repairer designated by the failure information providing request 43 only for a designated period.

Specifically, the failure information providing part 78 has a function of a WEB server with an authentication function, and puts the failure information 18 on a WEB page where only an authenticated person can access only during a viewing period designated by the user U. In the meantime, authentication information for allowing authentication is transmitted to the repairer at the e-mail address of the repairer through the electric communication line 16. Then, the repairer operates the repairer terminal 12 to access to the WEB page by using the authentication information, and views the failure information 18.

The failure information providing part 78 reads out the address for transmitting the data to the user U through the electric communication line 16 from the user management database 73, and uploads the address on the WEB page along with the failure information 18. Then, the repairer transmits the repair plan 67 to that address when transmitting the repair plan 67.

Since the information capable of specifying behaviors of the user U such as positional information of the vehicle 2 is included in the failure information 18, it is desirable to prevent a leak to third parties. Thus, the WEB page uploading the failure information 18 is created in a data format that cannot be downloaded to the terminals of the viewers and cannot be copied by the viewers by using functions of WEB browsers of the terminals of the viewers.

The failure information providing part 78 can use any form as appropriate as a providing form for providing the failure information 18 to the repairer other than the form using the WEB page.

Figure 5:
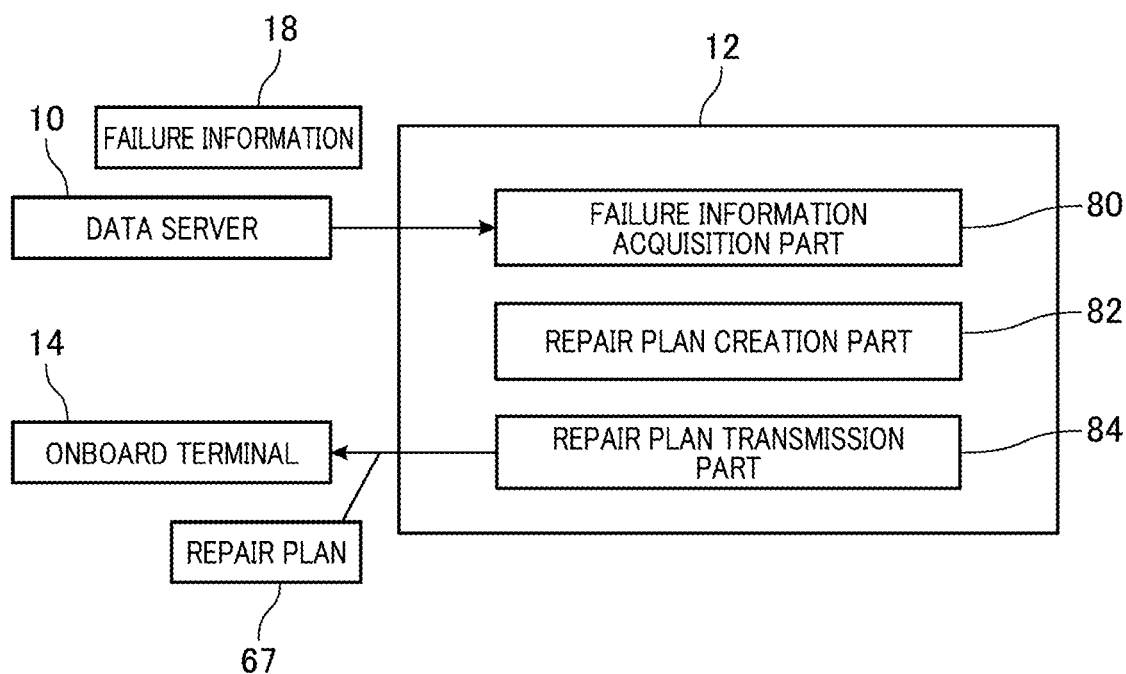
FIG. 5 is a block diagram showing a functional configuration of a repairer terminal.

FIG. 5 is a block diagram showing a functional configuration of the repairer terminal 12.

The repairer terminal 12 includes a failure information acquisition part 80, a repair plan creation part 82, and a repair plan transmission part 84. As the repairer terminal 12, used is a computer including a user operation input device (e.g., a keyboard or touch panel display), a display device, a communication device capable of connecting to the electric communication line 16 for communication, a processor such as a CPU or an MPU, a memory device such as a RAM or a ROM, and a storage device such as an HDD or an SSD. Functions of each part shown in FIG. 5 are implemented by executing computer programs by the processor of the repairer terminal 12.

The failure information acquisition part 80 allows the repairer to acquire the failure information 18 provided by the data server 10 through the electric communication line 16. In the present embodiment, the failure information acquisition part 80 has a function of the WEB browser, and allows the repairer to view the failure information 18 by accessing to the WEB page provided by the failure information providing part 78 of the data server 10.

The repair plan creation part 82 provides a creating function of the repair plan 67 to the repairer. This creating function is implemented by executing a prescribed application program by the repairer terminal 12, for example.

The repair plan transmission part 84 transmits the repair plan 67 to the address of the user U. As described above, this address is the address at which the user U can acquire the data by using any electronic apparatus. Therefore, the user U can check the repair plan 67 also with the electronic apparatus (e.g., the user terminal 7) other than the onboard terminal 4, so that convenience for the user U can be improved.

Next, operations of the vehicle data providing system 1 will be described in detail.

Figure 6:
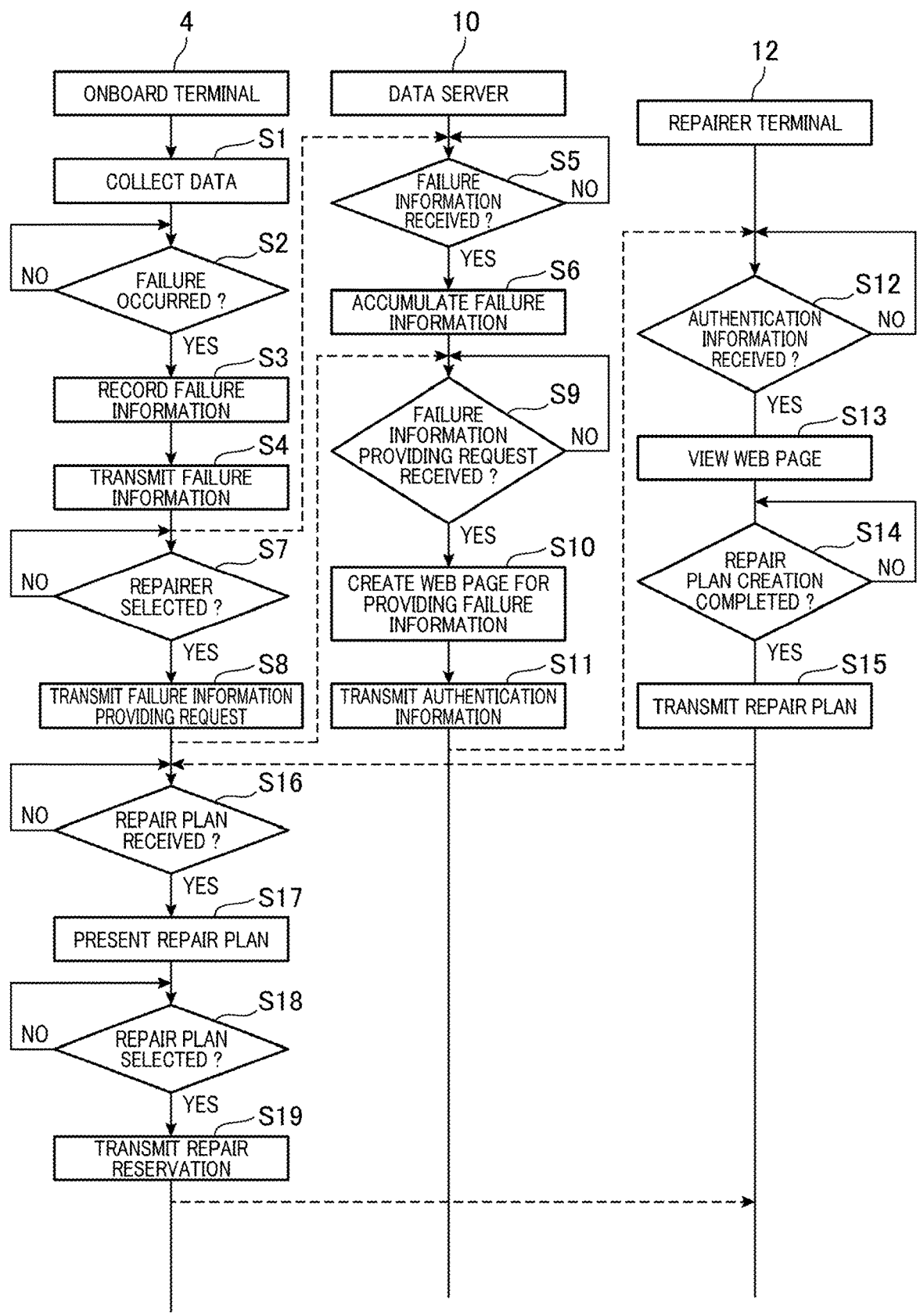
FIG. 6 is a sequence chart showing operations of the vehicle data providing system.

FIG. 6 is a sequence chart showing the operations of the vehicle data providing system 1.

It is to be noted that various kinds of information of the user U and the repairers are registered in advance in the user management database 73 and the repairer management database 75 of the data server 10.

In the onboard terminal 4, the vehicle data reception part 50 collects various kinds of data from each of the electronic control units 22, the position detection device 38, and the timing circuit 40 connected to the CAN 20 (step S1).

When a failure occurs in the vehicle 2 (step S2: YES), a failure code is received by the vehicle data reception part 50, and the failure information recording part 52 records the failure information 18 upon receiving the failure code (step S3). The failure information 18 is stored in the failure information storing part 54, and the failure information transmission part 56 transmits the failure information 18 to the data server 10 at an appropriate timing (step S4).

In the meantime, when receiving the failure information 18 (step S5: YES), the data server 10 accumulates the failure information 18 in the failure information accumulation part 72 (step S6).

Thereby, the failure information 18 transmitted from the onboard terminal 4 is accumulated in the data server 10.

Thereafter, in the onboard terminal 4, the providing target selection part 58 displays a repairer selection screen 90 on the touch panel display 37 in accordance with an operation of the user U, and waits for an input for selecting the repairer (step S7).

Figure 7:
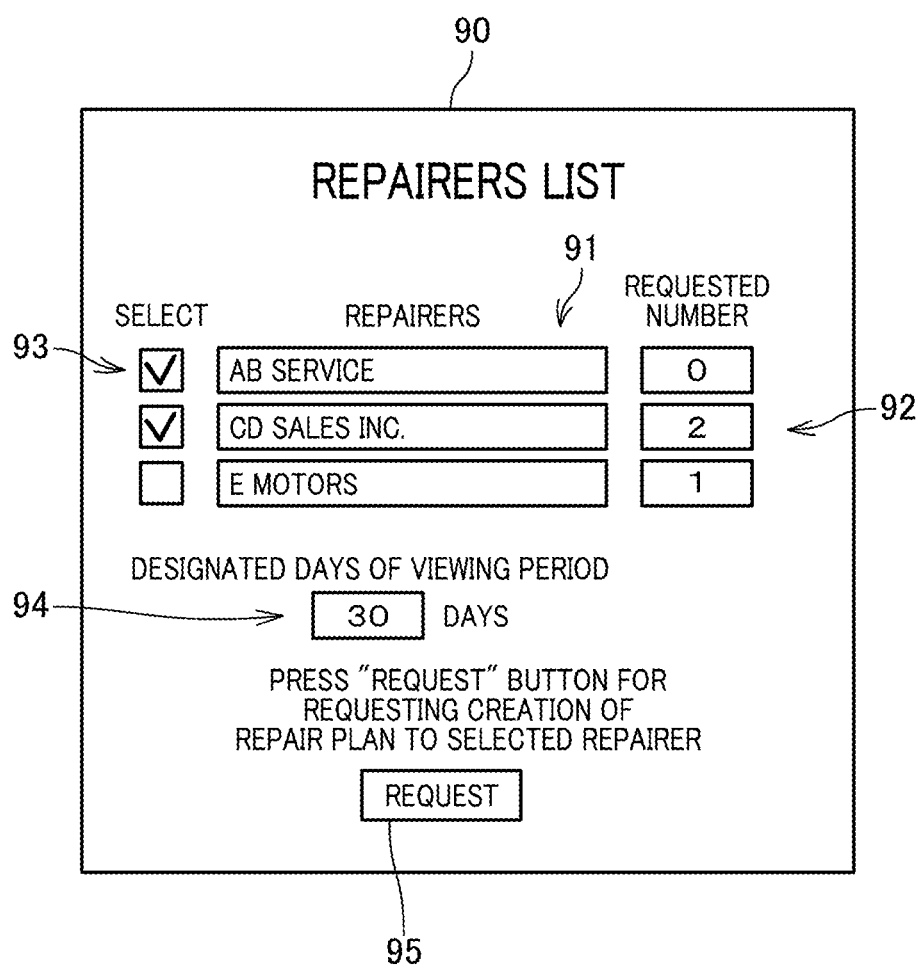
FIG. 7 is an illustration showing an example of a repairer selection screen.

FIG. 7 is an illustration showing an example of the repairer selection screen 90.

On the repairer selection screen 90, provided are a repairer display area 91, a requested number display area 92, a selecting area 93, a viewing period designation area 94, and a request button 95.

The repairer display area 91 is an area displaying a list of the repairers recorded in the repairer list information 59. The requested number display area 92 is an area displaying the number of repair requests made in the past for the repairers in the repairer display area 91. The number is counted based on the past repair record data (bills and details of the repair costs of the repairers, for example) accumulated in the storage device 34. The selecting area 93 is an area where the user U performs a selecting operation to input the repairer to request creation of the repair plan 67 by providing the failure information 18. The viewing period designation area 94 is an area for inputting the viewing period where the repairer can view the failure information 18. The request button 95 is an operation button for giving a command to the data server 10 to provide the failure information 18 to the repairer selected by the user U.

Note that any other information can be displayed on the repairer selection screen 90. Examples of such information may be evaluations of general users for the repairers, selling points of the repairers, and information of special benefits the repairers can provide to the user U. When displaying such information on the repairer selection screen 90, the providing target selection part 58 acquires the information from the data server 10 or other server computers through the electric communication line 16.

Returning to FIG. 6, when the repairer is selected and the request button 95 is operated by the user U on the repairer selection screen 90 (step S7: YES), the onboard terminal 4 transmits the failure information providing request 43 including the repairer and the viewing period selected by the user U to the data server 10 by using the failure information providing command part 60 (step S8).

When the data server 10 receives the failure information providing request 43 from the onboard terminal 4 (step S9: YES), the failure information providing part 78 generates a WEB page accessible only from an authenticated party in order to provide the failure information 18 to the repairer designated by the failure information providing request 43 only for a designated period, and uploads the failure information 18 on the WEB page only for the designated period (step S10). Then, the failure information providing part 78 transmits authentication information for allowing an access to the WEB page to the e-mail address of the repairer (step S11).

When receiving the authentication information by operating the repairer terminal 12 (step S12: YES), the repairer uses the repairer terminal 12 to access to the WEB page provided by the data server 10, and views the failure information 18 (step S13).

Further, the repairer determines the cause of failure based on the failure code 18A, the before-and-after-failure vehicle positions 18B, and the before-and-after-failure vehicle-operation-state information 18C included in the failure information 18, and decides the repair content. Then, the repairer creates the repair plan 67 by utilizing the repairer terminal 12.

When the repairer completes creation of the repair plan 67 (step S14: YES), the repairer terminal 12 transmits the repair plan 67 to the e-mail address of the user U in response to the operation of the repairer (step S15).

When the repair plan reception part 64 of the onboard terminal 4 receives the repair plan 67 (step S16: YES), the repair plan presenting part 66 displays the repair plan 67 on the touch panel display 37 to present to the user U (step S17).

When there are a plurality of the repair plans 67 being received already from different repairers in step S17, the user U can easily find a desired repair plan 67 through refining a search by the refining part 66A.

Then, when the repair plan 67 is selected and a command for transmitting a repair reservation is inputted by operations on the touch panel display 37 by the user U (step S18), the repair reservation transmission part 68 transmits the repair reservation information 69 to the e-mail address of the repairer of the selected repair plan 67 (step S19).

Thereby, the user U can easily make a repair reservation to the repairer providing the desired repair plan 67 among the plurality of repairers.

When the user U cannot find a satisfactory repairer as a result of reviewing the repair plan 67 presented in step S17 or when a desired repairer is not displayed on the repairer selection screen 90 when selecting the repairer, the user U requests a repair and the like to any repairer desired by the user U. In such case, the failure information 18 can be easily given to the repairer when requesting the repair through outputting in advance the failure information 18 to a portable memory device or the like from the failure information externally output part 62 of the onboard terminal 4, and an appropriate repair can be provided.

As described above, following effects can be achieved with the present embodiment.

In the present embodiment, the onboard terminal 4 records the failure information 18 including at least one position of the vehicle 2 before the timing of occurrence of a failure and at least one position of the vehicle 2 after the timing of the occurrence of the failure and vehicle operation information so as to be able to provide such information to the repairer undertaking the repair of the vehicle 2. Providing such failure information 18 to the repairer enables the repairer to easily specify the cause of failure.

Further, the onboard terminal 4 is configured to provide the failure information 18 to the repairer through the data server 10, so that it is unnecessary to manage the information such as transmitting destination of the failure information 18 for the repairer. Further, the data server 10 can efficiently collect the failure information 18 of a great number of the vehicles 2.

In addition, the onboard terminal 4 gives a command to the data server 10 in accordance with operations of the user U to provide the failure information 18, so that the user U can surely grasp that the failure information 18 is provided to the repairers as the third parties the user U is not personally acquainted with.

In the onboard terminal 4 of the present embodiment, the repairer to be provided with the failure information 18 is presented to the user U. Thus, the user U can know the repairer in advance and then perform an operation of providing the failure information 18 to the repairer.

The user U can select the repairer to provide the failure information 18 in the onboard terminal 4 of the present embodiment, so that the failure information 18 can be provided only to the repairer desired by the user U.

The onboard terminal 4 of the present embodiment gives a command to the data server 10 to provide the failure information 18 to the repairer only for the viewing period inputted by the user U.

Thereby, it becomes possible to decrease a risk of having the failure information 18 including the information (current position and the like of the vehicle 2) capable of specifying behaviors of the user U leaked to the third parties the user U does not know.

In the onboard terminal 4 of the present embodiment, each of the plurality of repair plans 67 is presented to the user U to be able to select one of the plans. When the repair plan 67 is selected by the user U, the repair reservation information for reserving a repair is transmitted to the repairer of that repair plan 67.

Thereby, the user U can easily make a repair reservation to the repairer providing the desired repair plan 67 among the plurality of repairers.

The onboard terminal 4 of the present embodiment includes a refining part 66A for refining a search of the plurality of repair plans 67 under a condition of at least one selected from due dates, locations of the repairers, actual repair costs of failures repaired in the past with a similar cause of failure written in the repair plans 67.

This enables the user U to easily find a desired repair plan 67.

In the present embodiment, the repair plan 67 is transmitted from the repairer to an address (an e-mail address, an account of SNS (Social Networking Service), or the like) at which the electronic apparatus such as the user terminal 7 operated by the user U can acquire the repair plan 67 via the electric communication line 16.

Thereby, the user U can check the repair plan 67 also with the electronic apparatus (e.g., the user terminal 7) other than the onboard terminal 4, so that convenience for the user U can be improved.

The onboard terminal 4 of the present embodiment includes a configuration for outputting the failure information 18 to external apparatuses (e.g., a portable memory device such as a USB memory, and the user terminal 7) connected to the external apparatus connection part 45.

Thereby, when the user U requests a repair to a repairer other than the repairers presented by the onboard terminal 4, the failure information 18 can be easily given to that repairer and an appropriate repair can be provided.

The above-described embodiment is merely an example of one aspect of the present invention, and any modifications and applications are possible without departing from the spirit and scope of the present invention.

For example, in the present embodiment described above, the user terminal 7 may be provided with each function of the onboard terminal 4 shown in FIG. 3. In such case, the user terminal 7 is wire-connected or wirelessly connected to the onboard terminal 4 and receives various kinds of data of the vehicle 2 through the onboard terminal 4.

Further, for example, in the present embodiment described above, the data server 10 is configured to receive the failure information 18 from the onboard terminal 4 and provide the failure information 18 to the repairers. However, the data server 10 may simply need to control supply of the failure information 18 to the repairers but may not need to store the failure information 18 by itself. For example, the data server 10 gives an access permission for the failure information 18 stored in the onboard terminal 4 or other server computers to the repairer to control supply of the failure information 18 to the repairers. Also, for example, supply of the failure information 18 may be controlled through transmitting the failure information 18 in an encrypted state from the onboard terminal 4 to the repairers and transmitting a decryption key for decrypting the failure information 18 from the data server 10 to the repairers.

In the present embodiment described above, the vehicle data providing system 1 includes the data server 10 and the repairer terminal 12 as a client terminal, and the failure information 18 is provided from the data server 10 to the repairer terminal 12 by the so-called client server system.

Meanwhile, the so-called PtoP (Peer-to-Peer) system may be employed to configure the vehicle data providing system for providing the failure information 18 to the repairer.

Figure 8:
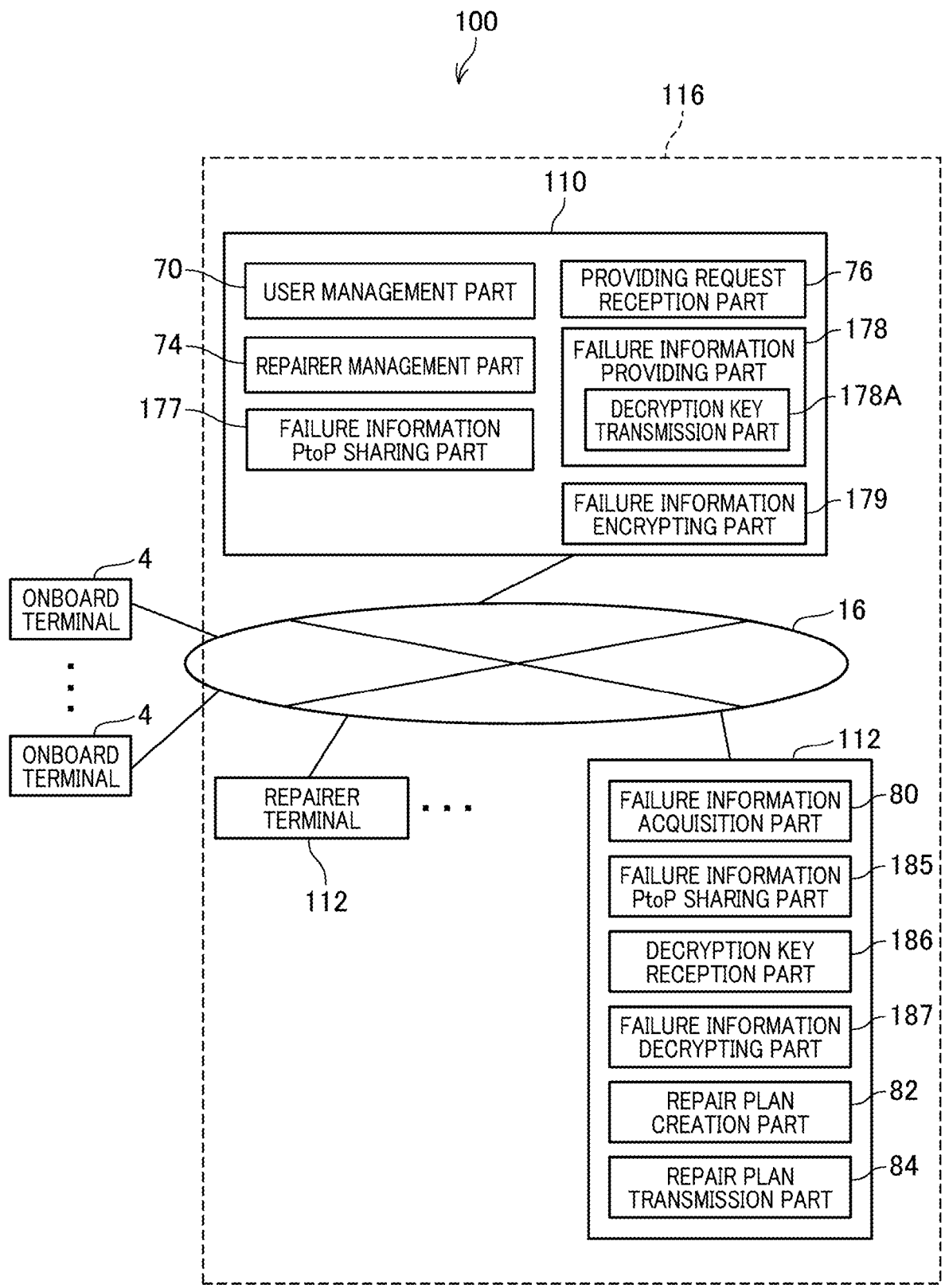
FIG. 8 is a diagram schematically showing a configuration of a vehicle data providing system according to a modification example of the present invention.

FIG. 8 is a diagram schematically showing a configuration of a vehicle data providing system 100 according to a present modification example. In FIG. 8, same reference signs are applied to the parts that have already been described above, and explanations are omitted.

The vehicle data providing system 100 includes a management terminal 110 and a plurality of repairer terminals 112 other than a plurality of onboard terminals 4 described above, and those are connected communicably to the electric communication line 16. Further, the management terminal 110 and the plurality of repairer terminals 112 form a PtoP network 116, and mutually share the failure information 18 transmitted from each of the onboard terminals 4.

In more details, the management terminal 110 is a computer corresponding to the data server 10 described above, and includes a user operation input device (e.g., a keyboard or touch panel display), a display device (a liquid crystal display or an organic EL), a communication device capable of connecting to the electric communication line 16 for communication, a processor such as a CPU or an MPU, a memory device such as a RAM or a ROM, and a storage device such as an HDD or an SSD. Further, in the management terminal 110, the processor executes computer programs to implement functions of each part shown in FIG. 8.

As shown in FIG. 8, the management terminal 110 includes a failure information PtoP sharing part 177 and a failure information encrypting part 179 as functional configurations.

The failure information PtoP sharing part 177 is configured to transmit the failure information 18 to the PtoP network 116 for enabling the repairer terminals 112 to share.

The failure information encrypting part 179 is configured to encrypt the failure information 18 received from each of the onboard terminals 4 with a prescribed encryption method and output to the failure information PtoP sharing part 177.

When transmitting the failure information 18, the failure information PtoP sharing part 177 transmits the encrypted failure information 18 so that the failure information 18 cannot be viewed at will on the repairer terminals 112 side.

Further, a decryption key transmission part 178A transmitting a decryption key for decrypting the failure information 18 is provided to the failure information providing part 178 of the management terminal 110.

As shown in FIG. 8, the repairer terminal 112 includes a failure information PtoP sharing part 185, a decryption key reception part 186, and a failure information decrypting part 187.

The failure information PtoP sharing part 185 is configured to share the failure information 18 in an encrypted state among the management terminal 110 and other repairer terminals 112 forming the PtoP network 116.

The decryption key reception part 186 is configured to receive the decryption key transmitted from the management terminal 110, and the failure information decrypting part 187 decrypts the failure information 18 by using the decryption key to release encryption.

Further, when the management terminal 110 receives the failure information providing request 43 from the onboard terminal 4 in the vehicle data providing system 100, the failure information providing part 178 transmits the decryption key to the repairer terminal 112 of the repairer selected by the user U.

In the repairer terminal 112, the decryption key reception part 186 receives the decryption key and the failure information decrypting part 187 releases encryption of the failure information 18 by using the decryption key for enabling the repairer to utilize the failure information 18.

Thereby, only the repairer selected by the user U can utilize (view and the like) the failure information 18.

In the present modification, a blockchain technique can also be used for a sharing technique of the failure information 18 through the PtoP network 116.

Specifically, blockchain data having a single piece of failure information 18 as one block is defined for each of the onboard terminals 4. Every time the management terminal 110 receives the failure information 18 from a given onboard terminal 4, the failure information PtoP sharing part 177, for example, connects the failure information 18 to the end of the blockchain data of that onboard terminal 4 and transmits to the PtoP network 116.

In the meantime, in each of the repairer terminals 112, the failure information PtoP sharing part 185, for example, checks validity of the blockchain data with the failure information 18 added anew by the management terminal 110. Then, when the validity of the blockchain data is approved by a specific number of terminals or more among the repairer terminals 112 and the management terminal 110 forming the PtoP network 116, all the repairer terminals 112 and management terminal 110 update the existing blockchain data to the new blockchain data.

Thereby, the reliability of the individual failure information 18 can be improved and the blockchain data of the failure information 18 is distributedly stored among a plurality of computers, so that a risk of losing the failure information 18 can be decreased. Further, a risk of having falsification of the blockchain data can be decreased as well.

In such case, not only the failure information 18 but also information of provided history to the repairer may be included in the blockchain data. Example of such information of provided history may be transmission record of the failure information providing request 43 transmitted according to selection of the repairers made by the user U, record of permissions for viewing the failure information 18 given to the repairers by the data server 10, and record of accesses (viewing) of the repairers to the failure information 18 from the repairer terminals 112 and the like. While the timings for connecting those records to the blockchain data are discretional, it is preferable for those records to be connected successively every time an event as a source to be recorded occurs. By including the information of the provided history in the blockchain data, actions taken by the user U and the repairer for providing the failure information 18 can be recorded while suppressing a risk of having falsification or losing such information, for example.

The present invention can be applied not only to the vehicle 2 but also any conveyances such as airplanes, ships, and self-propelled devices.

REFERENCE SIGNS LIST 1, 100 Vehicle data providing system (Conveyance data providing system)
2 Vehicle (Conveyance)
4 Onboard terminal (Conveyance information processing device)
7 User terminal (Conveyance information processing device)
10 Data server (Terminal managing failure information)
12, 112 Repairer terminal
16 Electric communication line
18 Failure information (Information including conveyance operation information)
18A Failure code
18B Before-and-after-failure vehicle positions
18C Before-and-after-failure vehicle-operation-state information
36 User interface part
37 Touch panel display
38 Position detection device
40 Timing circuit
43 Failure information providing request
45 External apparatus connection part
50 Vehicle data reception part (Conveyance data reception part)
52 Failure information recording part
56 Failure information transmission part
58 Providing target selection part
60 Failure information providing command part
62 Failure information externally output part
64 Repair plan reception part
66 Repair plan presenting part
66A Refining part
67 Repair plan
68 Repair reservation transmission part
72 Failure information accumulation part
73 User management database
78, 178 Failure information providing part
84 Repair plan transmission part
90 Repairer selection screen
116 PtoP network
177, 185 Failure information PtoP sharing part
U User

What is claimed is:

1. A conveyance information processing device comprising:
    a conveyance data reception part configured to receive a failure code for identifying a failure that has occurred in a conveyance, a current position of the conveyance, and conveyance operation information from the conveyance;
    a failure information recording part configured to record failure information including at least one position of the conveyance before timing of occurrence of the failure and at least one position of the conveyance after the timing of the occurrence of the failure and the conveyance operation information; and
    a failure information providing command part configured to give a command, in accordance with an operation of a user, to a terminal managing the failure information to provide the failure information to a repairer undertaking a repair of the conveyance through an electric communication line.

2. The conveyance information processing device according to claim 1, wherein the repairer to be provided with the failure information is shown to the user.

3. The conveyance information processing device according to claim 1, further comprising a providing target selection part capable of allowing the user to select the repairer to be provided with the failure information.

4. The conveyance information processing device according to claim 1, wherein the failure information providing command part gives a command to the terminal to provide the failure information to the repairer in accordance with a viewing period inputted by the user.

5. The conveyance information processing device according to claim 1, further comprising:
    a repair plan reception part configured to receive repair plans transmitted from each of a plurality of the repairers;
    a repair plan presenting part configured to present each of the repair plans to the user for allowing the user to select; and
    a repair reservation transmission part configured to transmit repair reservation information for reserving a repair toward the repairer of the repair plan selected by the user through the electric communication line.

6. The conveyance information processing device according to claim 5, further comprising a refining part configured to refine a search of the repair plans under a condition of at least one selected from due dates, locations of the repairers, and actual repair costs of failures repaired in the past with a similar cause of failure written in the repair plans.

7. The conveyance information processing device according to claim 5, wherein the repair plan is transmitted from the repairer to an address at which an electronic apparatus operated by the user can acquire the repair plan through the electric communication line.

8. The conveyance information processing device according to claim 1, further comprising:
    an external apparatus connection part where an external apparatus is connected; and
    a failure information externally output part configured to output the failure information to the external apparatus connected to the external apparatus connection part.

9. A control method of a conveyance information processing device configured to receive a failure code for identifying a failure that has occurred in a conveyance, a current position of the conveyance, and conveyance operation information from the conveyance, the control method comprising:
    recording failure information including at least one position of the conveyance before timing of occurrence of the failure and at least one position of the conveyance after the timing of the occurrence of the failure and the conveyance operation information; and
    giving a command, in accordance with an operation of a user, to a terminal managing the failure information to provide the failure information to a repairer undertaking a repair of the conveyance through an electric communication line.

10. A conveyance data providing system comprising:
a conveyance information processing device comprising a conveyance data reception part configured to receive a failure code for identifying a failure that has occurred in a conveyance, a current position of the conveyance, and conveyance operation information from the conveyance; and
a terminal configured to communicate with the conveyance information processing device through an electric communication line, wherein:
the conveyance information processing device comprises a failure information recording part configured to record failure information including at least one position of the conveyance before timing of occurrence of the failure and at least one position of the conveyance after the timing of the occurrence of the failure and the conveyance operation information;
the terminal manages the failure information; and
the conveyance information processing device comprises a failure information providing command part configured to give a command to the terminal in accordance with an operation of a user to provide the failure information to a repairer undertaking a repair of the conveyance through the electric communication line.

* * * * *